Dec. 15, 1959 C. G. WYMAN 2,917,087
APPARATUS FOR WINDING TIRE BEADS
Filed Jan. 29, 1957 2 Sheets-Sheet 1
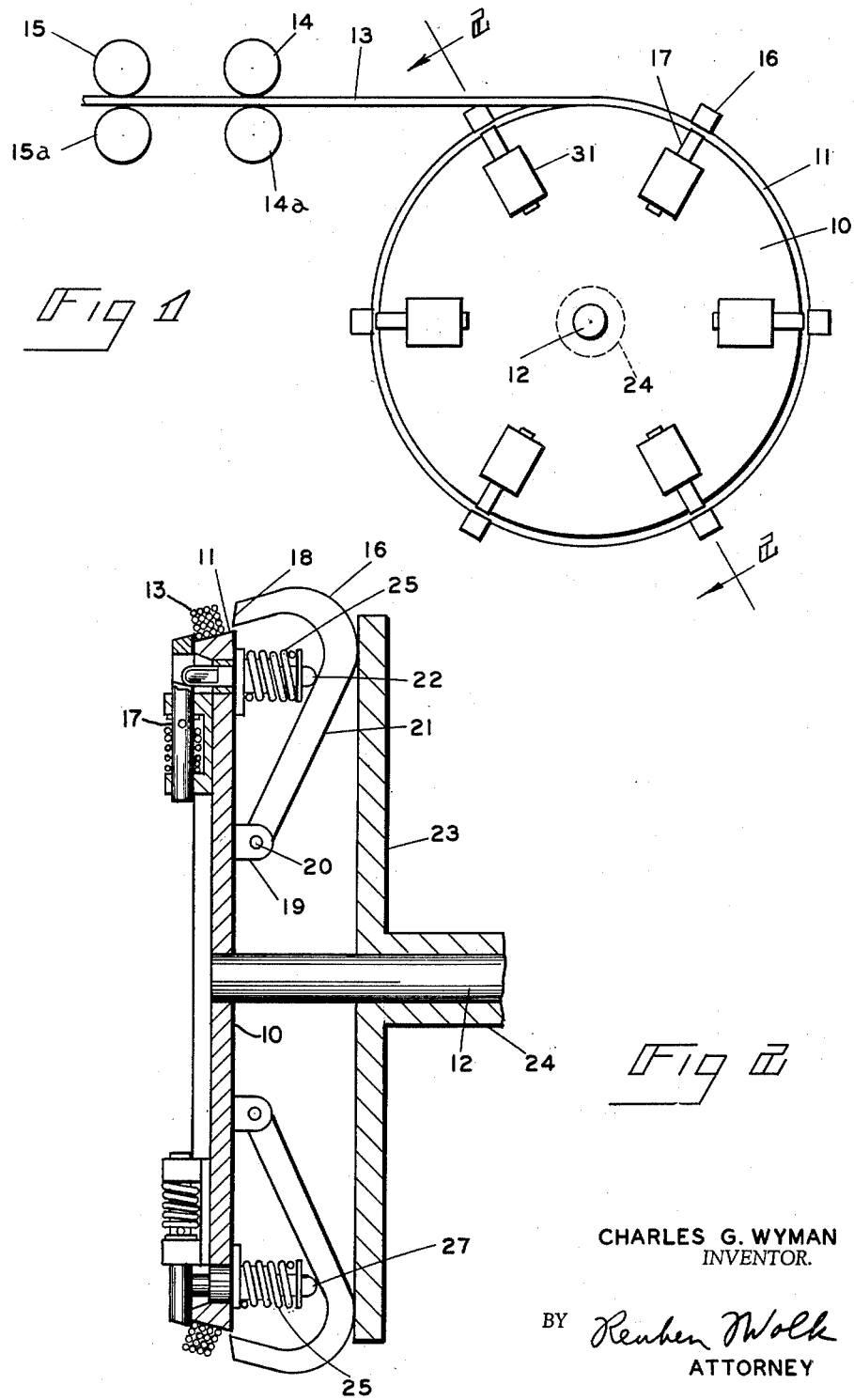
CHARLES G. WYMAN
INVENTOR.
BY Reuben Wolk
ATTORNEY

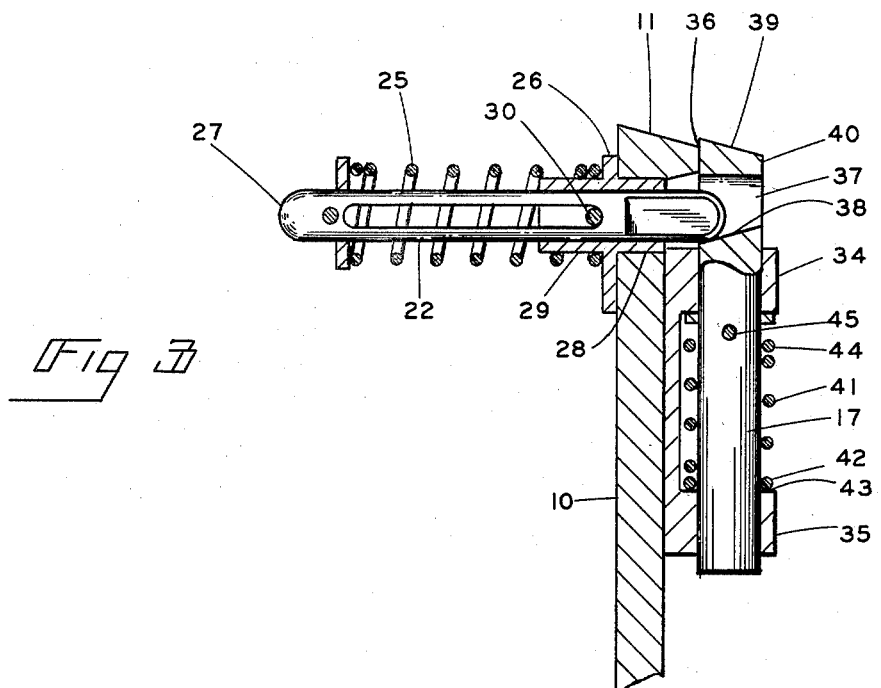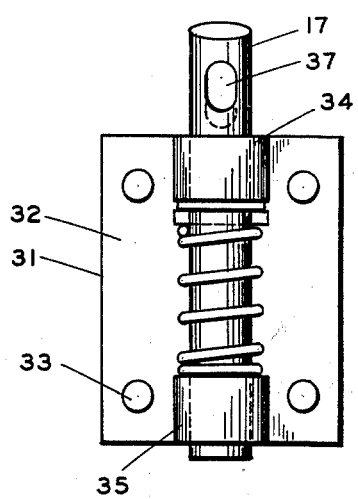

2,917,087

APPARATUS FOR WINDING TIRE BEADS

Charles G. Wyman, Dayton, Ohio, assignor to The Dayton Rubber Company, Dayton, Ohio, a corporation of Ohio Application January 29, 1957, Serial No. 636,900

5 Claims. (Cl. 140—92.2)

This invention relates to apparatus for forming tire beads and particularly such tire beads as may be employed in tubeless pneumatic tires.

In order to effect a more perfect enclosure of the air chamber of tubeless pneumatic tires as it is defined by the tire and the rim upon which the tire is mounted, it has been found desirable that the innermost surface of the rim contacting portion of the tire as well as the outer peripheral surface of the rim against which it is to be in air-sealing engagement should slope downwardly toward the center of the rim. That portion of conventional tires normally referred to as the bead area is founded upon a plurality of circular windings of one or more wires or inextensible strands of high tensile strength to form an annular bead or bead core of fixed and unyielding circumference which is positioned in the radially innermost portion of the side walls of the tire body thereby to establish and maintain its circular dimensions.

In the prior art, the above mentioned desired slope of the innermost surface of the rim contacting portion of the tire bead area has been accomplished merely by molding the tire so that the material immediately surrounding the bead core will be shaped to have the desired slope. More recently however, it has been found desirable in such cases that the radially innermost surface of the bead core itself should be sloped so that it will be substantially parallel to the sloping innermost surface of the tire.

In order to provide a bead with the desired sloping surface, it has been necessary to initially wind the strands of which the bead is to be comprised upon a forming mandrel which itself has a sloping surface so that all of the windings in the core will be uniformly supported by such surface. Where a sloping mandrel surface such as a conical surface is employed, it has quite naturally developed that difficulties have been encountered in preventing the individual windings of the bead from slipping off of the mandrel while the winding is in progress. Where a lip or flange is provided to prevent such slipping and to hold the individual windings of the bead wire or like material upon the mandrel until the bead has been completely formed, considerable difficulty has been encountered in removing the formed bead from the mandrel because, as stated above, the bead is of relatively fixed circumference and the forming mandrels involving a flange or lip have had to be collapsed or disassembled before the bead can be removed. In such cases considerable time and effort have been involved and it has heretofore been impossible to remove the bead from such a mandrel without some manual operation which in itself adds to the cost of tire manufacture.

It is accordingly an object of the present invention to provide an apparatus for the formation of tire beads.

It is a further object of the present invention to provide an apparatus for the formation of tire beads especially adapted for use in tubeless tires.

It is still a further object of the present invention to provide an apparatus for the formation of tire beads, the radially innermost surface of which will slope downwardly toward the center of the wheel or rim when the tire is mounted upon its wheel.

It is yet another object of the present invention to provide an apparatus having a sloping bead-forming surface and means for preventing the slippage of the bead from the surface while it is being wound thereon and until final removal of the completed bead is desired.

It is still another object of the present invention to provide such an apparatus from which the finished bead may be removed without manual operation or other excessive expenditures of time and effort.

These and other objects and advantages of the present invention which will be apparent from a reading of the following disclosure are achieved in the apparatus hereof which is founded upon a forming plate or disc having a downwardly sloping bead forming surface about its outer periphery. A slidable lip or flange across the lower edge of the sloping surface may be selectively controlled so that it will retain the bead upon such surface while the bead is being wound or otherwise formed but will be readily and automatically removed from its bead-retaining position when bead removal is desired. The bead retaining lip or flange according to the present invention is preferably provided by a circumferential series of bars which are radially positioned along that broadside surface of the forming plate or disc which intersects the lower edge of the sloping bead forming surface. Where a truncated conical disc is employed, the retaining bars are slidable across the truncated surface thereof, which is the smaller of the circular broadside surfaces thereof and is in spaced parallel relation with the larger of such surfaces and known as the base. In their normal position, the bars are so arranged near the outer periphery of the disc that one end of each will extend radially outwardly of the lower or radially innermost edge of the sloping surface so as to provide a flange or lip to form a trough with the sloping surface thereby to retain the bead wire as it is being wound thereon. Means are provided for controlling the radial position of the retaining bar so that when removal of the bead is desired, the bar may be withdrawn from its position projecting beyond the edge of the forming surface whereupon the bead, now completely formed thereon, may be conveniently and easily slid from the sloping surface.

In conventional bead winding machines involving a bead forming surface which is parallel to the axis of rotation of the bead forming disc or plate, it has been the common practice to employ push-off or ejector arms pivotally mounted at some point upon the disc or other parts of the machinery so that it will sweep across the forming surface and push the formed bead therefrom. In a preferred embodiment of the present invention, similar ejector arms are employed with only the modification necessary to cause them to sweep over the inclined rather than the horizontal surface characteristic of the prior art apparatuses. Where such ejector arms are pivotally mounted to the base or the larger of the broadside surfaces of the conical disc and therefore sweep in a direction of the downward slope of the conical peripheral surface, it has been found that they or the identical means by which they are actuated may be employed for also causing the retaining bars to be removed from their bead retaining position while the bead is being removed. This is accomplished by providing passages through the bead forming disc and through the retaining bars and so locating these passages that when the bar is in bead retaining position, the passage therethrough will be slightly offset or eccentric to the passage through the disc. A push rod designed to slide transversely of the disc and the retaining bar may then be operated through the passages and, in passing toward the retaining bar, will cause the opening therein to become perfectly aligned or concentric with the opening through the bead forming disc. As a result of this alignment, the retaining bar will be withdrawn from its normal position so that the bead may be conveniently removed from the bead forming surface without hindrance. Since this push rod moves in the same direction as the ejector arm described above, it can be appreciated that the ejector arm itself or the means by which it is actuated may be employed for simultaneously moving the push rod and thereby removing the retaining bar from its projecting position.

Once the retaining bars have been removed from their bead retaining position as explained above and the ejector arms have swept across the bead forming surface to remove the bead therefrom, means are provided for causing the ejector arms to return to their original position from which they may again be actuated to remove a subsequently formed bead. The means for returning the ejector arms and the retaining bars to their normal position may be automatic so that once the actuating force which originally caused them to assume the proper position for ejection or removal of the bead is removed, the device will automatically return to a position accommodating the formation of another bead. Such means may involve suitable tension or compression springs so positioned that the ejector arms and bead retaining bars will be urged to their normal position as desired.

The invention thus generally described may be more clearly understood from a reading of the following detailed description of one preferred embodiment thereof in connection with which reference may be had to the appended drawings.

In the drawings:

Figure 1 is a schematic elevational view showing a bead forming disc according to the present invention.

Figure 2 is an elevational view in partial cross section on the line 2—2 of Figure 1.

Figure 3 is an enlarged cross section through the peripheral portion of the bead-forming disc of the present invention showing the means for actuating the bead retaining bar.

Figure 4 is a plan view of the mounting block accommodating the requisite motion of the bead retaining bar.

The number 10 designates generally the truncated conical bead forming plate or disc having a tapering or axially downwardly sloping bead forming surface 11 about its outer periphery. This disc 10 is rotatable about the shaft 12 and may be rotatably driven by any conventional means such as an electric motor [not shown]. The bead wire or strand 13 employed in the formation of the bundle of strands to form the tire bead or bead core is wound upon the rotating disc 10 by being first anchored thereto by conventional means such as suitable clips and being pulled or pushed thereon, the travel of the strand 13 being further controlled by suitable rollers or snubbing bars 14, 14a, 15 and 15a which, according to conventional practice may be so spaced and driven at such speeds that the tension of the strand as it is being wound will be carefully controlled. Beyond this, according to the conventional practice, the rollers 14, 14a, 15 and 15a may also act as anvils for preforming or imparting at least a partial curvature to the strand 13 before it actually enters upon the disc. Since however, this preliminary treatment and control of the approach of the bead wire 13 to the disc is not a part of the present invention, a detailed description thereof is not included in this description.

Circumferentially spaced about the outer periphery of the disc 10 are positioned the ejector arms 16 and the bead retaining bars 17. Since the ejector arms 16 are to act in the direction of the downward slope of the forming surface 11, these arms are preferably placed on the base or back side of the side which is the larger of its broadside surfaces or that surface which intersects the bead forming surface 11 at the highest point of its slope. Conversely, since the bead being formed upon the surface 11 will tend to slip down the slope and off of the surface, the retaining bars 17 are located upon the truncated or smaller of the broadside surfaces of the disc or upon that surface thereof which intersects the forming surface 11 at the lowest point of its slope. While the ejector arms are shown as being positioned in the same radial position as the bars, it is conceivable that the bars could be radially spaced from the arms. As will be explained below however, in this one preferred embodiment, the movement of the arms is relied upon for actuation of the retaining bars so that it is desirable that the bars and the arms should be oppositely placed in substantially the same radial position.

As best shown in Figure 2, the ejector arms 16 are in the form of substantially C-shaped members with that leg or angularly disposed portion 18 being sloped similar to the slope of the bead forming surface 11. The arm 16 is preferably pivotally mounted to the bead forming disc 10 by means of a suitable hinge block 19 and hinge pin 20 so that the back portion 21 of the arm will be swingable relative to the forming disc 10 and may operate upon the push rods 22 as hereinafter explained. While the arms may be actuated in any of several ways according to conventional practices already employed in the art, it has been found particularly suitable in the case where a circumferential series of the arms is employed, the arms being radially spaced throughout the entire circumference of the disc to employ a pusher plate or backing member 23 which may be affixed to an axially reciprocable hollow shaft 24 around the shaft 12 upon which the bead forming disc 10 rotates. This backing plate 23 may be forced or driven by eccentiric or other conventional means axially of the shafts 12 and 24 toward the forming disc 10 so that it will contact the back portions 21 of the arms 16 thereby forcing the angularly disposed legs 18 of the arms across the sloping peripheral surface 11 of the disc 10. Once again, it will be noted that the angular legs 18 of the arms 16 are so disposed that they will correspond to or be aligned with the slope of the peripheral surface 11 of the bead forming disc 10 and will act to eject the bead 13 being formed thereon. Once the backing plate 23 has been pushed toward the forming disc 10 to the point that the arms will have moved across the forming surface 11, the plate 23 may be returned to its original position by positive or automatically acting means such as suitably positioned springs; and the arms 16 may follow upon their actuation by the same or similar means. In the preferred embodiment illustrated in Figure 2, it will be noted that coiled compression springs 25 are positioned around the push rods 22 so that the ends of the spring will seat against a suitable base 26 and the enlarged head 27 of the push rod. Once the force which has urged the plate 23 toward the forming disc 10 has been released, the coil spring 25 will tend to expand thereby forcing the arm 16 and the plate 23 back to their original position; i.e., their position prior to their being actuated to allow for the removal of the bead from the forming surface 11.

The operation of the push rod 22 and its influence upon the relative position of the retaining bar 17 is best shown in Figure 3 wherein the parts are shown in enlarged cross section. Here it will be noted that the push rod 22 is of circular cross section and is slidable within the passage 28 through the forming disc 10 near its outer periphery. A suitable bearing and guide may be provided as shown at 29 in the form of a bushing inserted in the passage 28 and the reciprocation of the rod may be further controlled by appropriate set screws such as 30 acting against one side of the rod. The bearing or bushing 29 is provided at its end in the direction of the rod 22 with a seat against which the coil spring 25 may act. The other end of this spring will seat against the inwardly disposed flat portion of the head of the push rod which head 27 is rounded so as to accommodate the rocking or sliding contact with the ejector arm 16 and particularly with the back portion 21 thereof. The rod 22 is preferably of such a length that when it is in its normal position; i.e., occupying the entire passage 28 through the disc 10 and partially entering into the passage 37 through the bar 17, the flat or rounded head 27 of the rod will be in contact with the inwardly disposed surface of the back portion 21 of the ejector arm 16. This back portion 21 is spaced from the broadside surface of the disc upon which it is mounted by at least a sufficient distance that in moving toward the disc and causing the angularly disposed leg 18 to approach the bead forming surface 11, it will first push the rod completely through the passage 37 of the bar 17.

The retaining bar 17 is slidably mounted for reciprocal motion parallel to the broadside surface of the disc 10 which intersects the forming surface 11 at the lowest point of its slope. To accommodate this reciprocal sliding motion, the mounting block 31 illustrated in Figure 4 may be employed. This block consists of a base 32 provided with appropriate openings such as 33 to receive means for fastening it to the truncated broadside surface of the disc 10 from which base project guiding lugs 34 and 35 which are provided with aligned openings through which the bar 17 may pass. In order to accommodate the spacing which will necessarily be required between the bar and the broadside surface of the disc to which it is mounted for slidable motion, the forming surface 11 of the disc 10 is preferably provided with an overhanging portion 36 so that the width of the forming disc 10 at its periphery or in the vicinity of the forming surface 11 will be wider than the body of the discs and the bar 17 will be in contact with the lowest edge of the forming surface 11.

The bead retaining bar 17 is provided with a passage 37 which corresponds substantially to the cross sectional dimensions of the push rod 22 but which is eccentric or off set as for example in the illustration shown in Figures 3 and 4 being provided with an inclined surface 38 along its bottom or its wall away from the direction of the peripheral surface 11 of the disc 10. The passage 37 is located so that when the radially innermost edge of the inclined surface 38 thereof is aligned or registers with the radially innermost surface of the passage 28 through the disc 10, the outer end 39 of the bar will extend beyond or project radially outwardly of the lower or radially innermost edge of the sloping surface 11. As the push rod moves perpendicularly to the retaining bar against the inclined surface which is inclined upwardly or in a direction opposed to the downward slope of the bead forming surface 11, the rod 22 will serve to push the bar 17 in a direction opposed to that of the incline of the surface 38 whereupon the retaining bar will drop down and its upper surface 39 will be flush or in line with the sloping bead forming surface 11. While the illustration shows the surface 39 of the retaining bar to be sloped at the same angle as that of the bead forming surface 11 which in the case of the preferred embodiment shown, is approximately 15 degrees, it is not absolutely necessary that this slope be provided on the retaining bar. Where such a slope is provided however, it eliminates any complication or hindrance which might be provided to resist the easy removal of the bead from the surface since the extreme corner 40 of the bar is completely out of the way. In order to more precisely control the sliding motion of the push rod 22 and to insure its firm and uniform contact with the inclined surface 38 of the passage through the retaining bar 17, the set screw 30 is positioned to operate against that surface of the rod 22 opposite the surface thereof which will be in contact with the inclined surface 38. It will be appreciated that as the rod moves transversely of the forming disc and the bead retaining bar 17, it will push the bar downward or toward the center of the disc whereupon a bead previously formed on the surface 11 as shown in Figure 2 may be easily removed. In order that the bar 17 will be withdrawn until its surface 39 is flush with or below the forming surface 11, the vertical rise of the inclined surface 38 should at least equal the distance by which the bar normally projects beyond the lower edge of the sloping surface 11.

Once the bead has been so removed, the actuating forces, which in the case of the embodiment described, need act only upon the ejector arm 16 and may be conveniently provided by the backing plate 23 suitably actuated as described above, may be relieved whereupon the compression spring 25 surrounding the push rod 22, having been compressed by these actuating forces, will expand or elongate axially so as to withdraw the rod 22 from the passage 37 in the bar 17. At the same time the spring 25, acting through the head 27 of the rod 22 will push the ejector arm 16 back away from the bead forming surface 11. In cooperation with this returning force of the coil spring 25 a similar compression spring 41 may be provided surrounding the retaining bar 17. The spring 41 will rest at its end 42 against the face 43 of the leg 35 and will be affixed at its other end 44 to the bar 17 for example by the bolt or pin 45 passing through the bar 17 and overhanging the end 44 of the spring. As the retaining bar is moved radially inwardly under the influence of the push rod passing transversely thereof, the spring 42, like the spring 25 around the push rod 22, will be compressed, but upon the release of the forces holding the push rod 22 in the passage 37 of the bar 17, the rod as explained above will be withdrawn from the bar and the spring 42 will therefore elongate axially to cause the bar to again return to the position wherein it extends above the lowest edge of the forming surface 11 so as to retain the bead to be subsequently wound thereon.

In the preferred embodiment above described, it can be appreciated that a single actuating force may be employed for removing the bead from the sloping bead forming surface and this force may conveniently be that which is already customarily provided in such devices. The force acting to move the ejection arm across the bead surface simultaneously acts upon the push rod to cause it to pass against the retaining bar which is positioned as described above so that the action of the push rod will cause the bar to withdraw from its bead retaining position at the same time the bead tends to be forced from the forming surface by the operation of the angularly disposed leg 18 of the ejection 16 after which, upon the release of this single force, the apparatus will return to the position wherein the arm is out of the way and the bar is in bead retaining position for the subsequent winding of a bead upon the sloping surface. As a result, a bead having a sloping inner periphery to achieve the desired slope sought in the finished tire may be constructed without excessive additional equipment and without the additional expenditure of any time or effort in the removal of the bead from the surface.

While the present invention has been described in considerable detail in connection with the preferred embodiment disclosed herein, it is to be understood that the foregoing detail and particularization have been for the purpose of illustration only and are in no way intended to limit the scope of the present invention as it is more specifically defined in the subjoined claims.

I claim:

1. A tire bead forming apparatus comprising a truncated conical bead forming disc having a circular base, a circular truncated surface of smaller diameter than said base in spaced parallel relation thereto and a conical peripheral surface connecting said base and said truncated surface, a plurality of ejector arms each having a back portion pivotally mounted at one end to the base of said disc, extending radially thereof and having an angularly disposed portion extending toward said disc and aligned with the slope of the conical surface thereof, means for moving said arms toward said disc whereby the angular portion of said arms will pass over and move along the conical surface of said disc, a plurality of passages transversely of and through said disc opposite the back portion of said ejector arms, a plurality of radially extending bead retaining bars slidable along said truncated surface and across said conical surface and positioned respectively to overlie the passages through said plate, a passage through and transversely of each of said bars, the radially innermost surface of such passages through said bars having an upwardly sloping surface convergent with said conical surface and said passages in said bars being so positioned that when said upwardly sloping surfaces register with the radially innermost surface of the passages through said disc, the bars will project radially outwardly of the periphery of said truncated surface and a plurality of push rods slidable through the passages through said disc and said bars and normally extending from the back portion of said ejector arms through the passages through said plate and being of such a length that when the ejector arms are moved forward until the angularly disposed portion thereof approaches the said conical surface, the end of the rod opposite that in contact with said arms will have passed through the passages through said plate and said bar along the upwardly inclined surface of the latter at least to a point at which the bar will be moved radially inwardly to be aligned with the radially innermost edge of said conical surface.

2. A tire bead forming apparatus comprising a truncated conical bead forming disc mounted upon a rotatable shaft and having a circular base, a circular truncated surface of smaller diameter than said base in spaced parallel relation thereto and a conical peripheral surface connecting said base and said truncated surface, a circumferential series of ejector arms each having a back portion pivotally mounted at one end to the base of said disc, extending radially thereof and having an angularly disposed portion extending toward said disc and aligned with the slope of the conical surface thereof, intermittently acting, releasable means for moving said arms toward said disc whereby the angular portion of said arms will pass over and move along the conical surface of said disc, a circumferential series of passages transversely of and through said disc opposite the back portion of said ejector arms, a circumferential series of radially extending bead retaining bars slidable along said truncated surface and across said conical surface and positioned respectively to overlie the passages through said plate, a passage through and transversely of each of said bars, the radially innermost surface of such passages through said bars having an upwardly sloping surface convergent with said conical surface and said passages in said bars being so positioned that when said upwardly sloping surfaces register with the radially innermost surface of the passages through said disc, the bars will project radially outwardly of the periphery of said truncated surface and a plurality of push rods slidable through the passages through said disc and said bars and normally extending from the back portion of said ejector arms through the passages through said plate and being of such a length that when the ejector arms are moved forward until the angularly disposed portion thereof approaches the said conical surface, the end of the rod opposite that in contact with said arms will have passed through the passages through said plate and said bar along the upwardly inclined surface of the latter at least to a point at which the bar will be moved radially inwardly to be aligned with the radially innermost edge of said conical surface.

3. An apparatus according to claim 2 wherein the vertical rise of the upwardly sloping surface of the passage through said bars is at least equal to the distance of the projection of said bars outwardly of the periphery of said truncated surface when the said upwardly sloping surfaces are in registry with the radially innermost surface of the passages through said disc.

4. A tire bead forming apparatus comprising a truncated conical bead forming disc mounted upon a rotatable shaft and having a circular base, a circular truncated surface of smaller diameter than said base in spaced parallel relation thereto and a conical peripheral surface connecting said base and said truncated surface, a circumferential series of ejector arms each having a back portion pivotally mounted at one end to the base of said disc, extending radially thereof and having an angularly disposed portion extending toward said disc and aligned with the slope of the conical surface thereof, a backing plate in spaced parallel relation to said disc mounted for axially reciprocable movement relative thereto, releasable means for urging said plate toward said disc against said arms causing the angularly disposed portions thereof to traverse said conical surface, a circumferential series of passages transversely of and through said disc opposite the back portion of said ejector arms, a circumferential series of radially extending bead retaining bars slidable along said truncated surface and across said conical surface and positioned respectively to overlie the passages through said plate, a passage through and transversely of each of said bars, the radially innermost surface of such passages through said bars having an upwardly sloping surface convergent with said conical surface and said passages in said bars being so positioned that when said upwardly sloping surfaces register with the radially innermost surface of the passages through said disc, the bars will project radially outwardly of the periphery of said truncated surface and a plurality of push rods slidable through the passages through said disc and said bars and normally extending from the back portion of said ejector arms through the passages through said plate and being of such a length that when the ejector arms are moved forward until the angularly disposed portion thereof approaches the said conical surface, the end of the rod opposite that in contact with said arms will have passed through the passages through said plate and said bar along the upwardly inclined surface of the latter at least to a point at which the bar will be moved radially inwardly to be aligned with the radially innermost edge of said conical surface.

5. An apparatus according to claim 4 wherein said backing plate is mounted upon an axially reciprocable hollow shaft surrounding said rotatable shaft.

References Cited in the file of this patent

UNITED STATES PATENTS

| | | |
|---|---|---|
| 1,007,039 | McCullough | Oct. 24, 1911 |
| 1,503,272 | Lewellyn | July 29, 1924 |
| 1,906,303 | Andrews | May 2, 1933 |
| 1,946,455 | Davis | Feb. 6, 1934 |
| 1,964,445 | Wikle | June 26, 1934 |
| 1,986,094 | Allan | Jan. 1, 1935 |
| 2,114,287 | Cullin | Apr. 19, 1938 |
| 2,116,735 | Stevens | May 10, 1938 |
| 2,317,290 | McIlvried | Apr. 20, 1943 |